(No Model.) 2 Sheets—Sheet 1.

E. A. SPERRY.
ELECTRIC CONTROLLER.

No. 562,501. Patented June 23, 1896.

Witnesses.
Louis P. Abell.
J. B. McGirr.

Inventor.
Elmer A. Sperry.

(No Model.)  2 Sheets—Sheet 2.

E. A. SPERRY.
ELECTRIC CONTROLLER.

No. 562,501.  Patented June 23, 1896.

WITNESSES.
A. H. Abell.
A. J. Macdonald.

INVENTOR.
Elmer A. Sperry, by
Geo. R. Blodgett,
Atty.

UNITED STATES PATENT OFFICE.

ELMER A. SPERRY, OF CLEVELAND, OHIO, ASSIGNOR TO THE GENERAL ELECTRIC COMPANY, OF NEW YORK.

ELECTRIC CONTROLLER.

SPECIFICATION forming part of Letters Patent No. 562,501, dated June 23, 1896.

Application filed February 20, 1895. Serial No. 539,146. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Electric Controllers, of which the following is a specification.

My invention relates to electric controllers; and it consists in improvements in the devices for operating the controller, the arrangement of the parts and electrical connections, and their disposition as to the main moving elements of the device as a whole.

It further consists in details of construction tending to cheapen the manufacture of such controllers and at the same time to broaden the scope of usefulness and adaptability for use in connection not only with electric motors and especially those for use in operating electric cars, but it also includes means whereby the said motors shall be converted into a generator, and, further, means whereby the current so generated may be usefully directed, employed, and controlled. This is fully described in the following specification and pointed out in the claims, and shown in the accompanying drawings.

Figure 1:
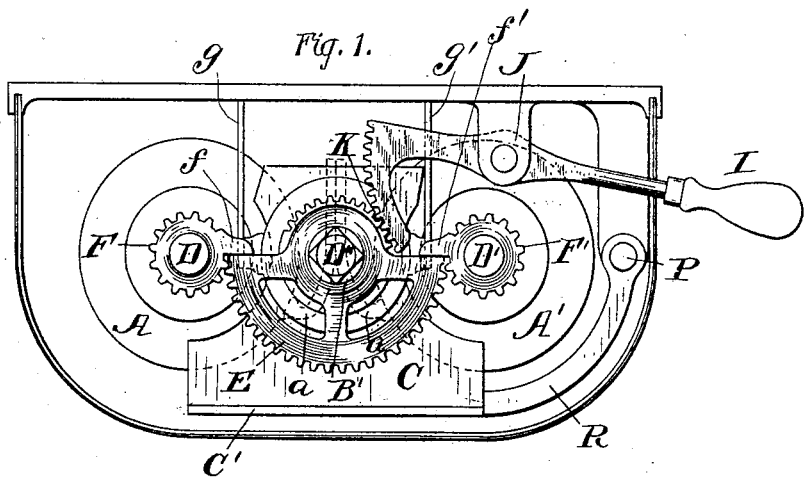
Figure 2:
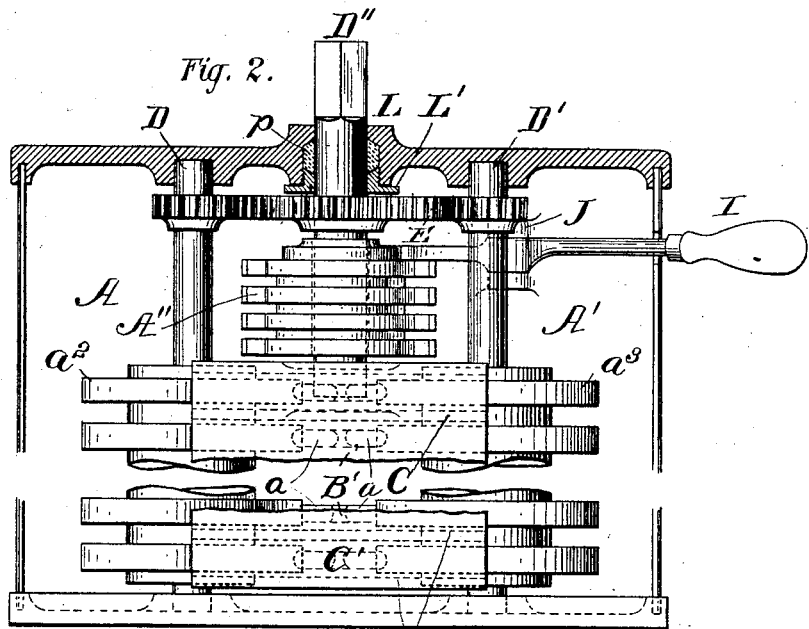
Figure 3:
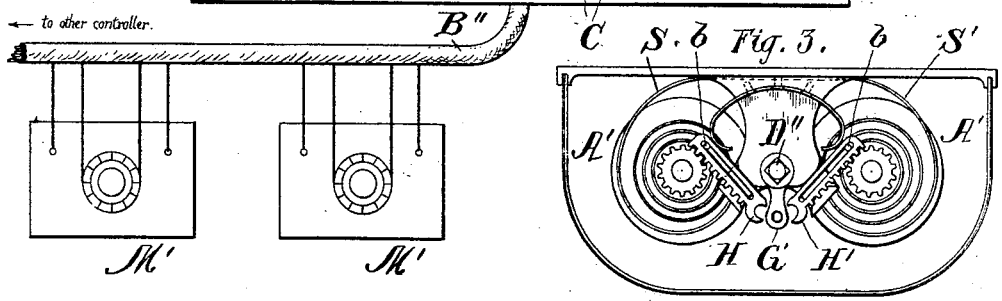
Figure 4:
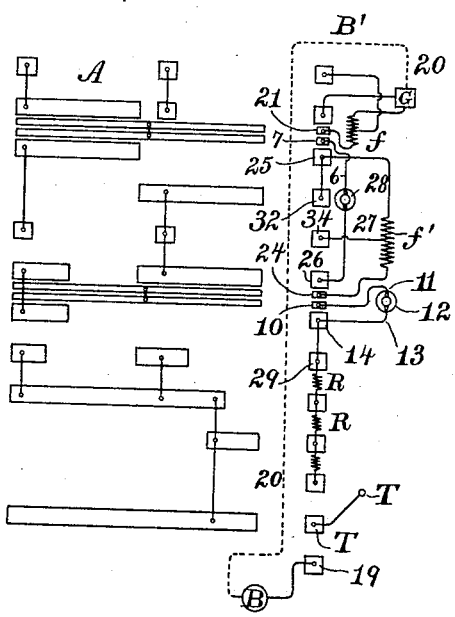
Figure 5:
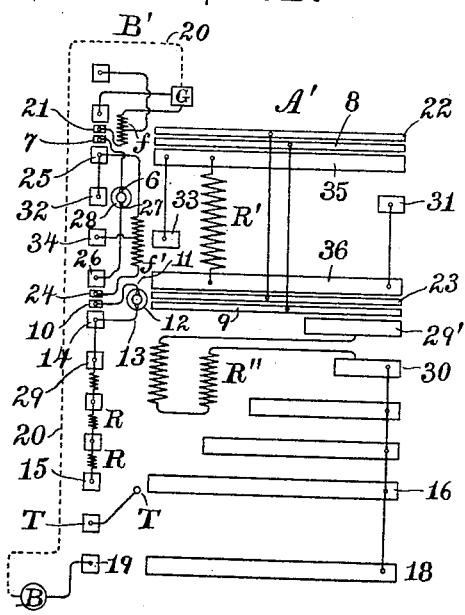
Figure 6:
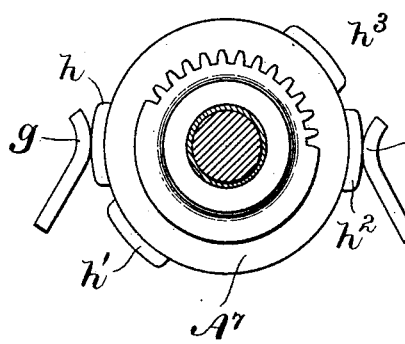
Figure 7:
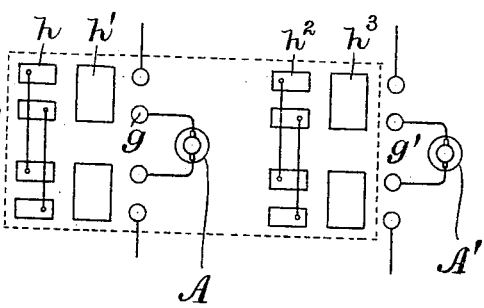
Figure 8:
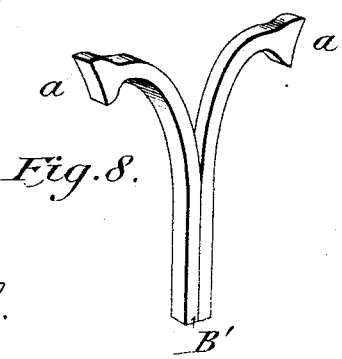

In the accompanying drawings, attached to and made a part of this specification, Figure 1 is a plan view of a controller with the top removed. Fig. 2 is a side elevation, partly in section, of the same. Fig. 3 is a modification. Figs. 4 and 5 are developments of the controller and brake cylinders, respectively. Figs. 6 and 7 are details of the reversing-switch. Fig. 8 is a perspective view of a contact-brush.

Mounted in suitable bearings in the controller-case are the commutating-cylinder A and the brake-cylinder A', the former for regulating the energy supplied to the motors when used for propelling the car, the latter for regulating the energy supplied to the brake-magnets when the motors are acting as generators.

The cylinders are operated by means of a common handle, which is mounted on the shaft D''. This shaft is provided with a suitable bearing L, which is a common form of stuffing-box, and is provided with packing $p$, compressed by means of the gland L', preventing all moisture from leaking down through the top and into the working parts of the controller.

Upon the shafts D and D' are mounted gears F and F', engaging with the segmental gear E, which is carried and actuated by the shaft D''.

In the shaft D'' is sleeved the reversing-switch A'', provided with a number of insulating-rings upon which are mounted contacts for reversing the relation of the fields and armatures of the motors. Mounted on the switch-cylinder is a segmental gear K, engaging with a sector actuated by the handle I, the latter pivoted at the point J in lugs which are cast integral with the back of the controller.

Brushes B' are mounted on a suitable support and engage with the contacts carried by the cylinders for varying the circuit relations. The ends of the brushes B' are bifurcated at $a\ a$, in such a manner that each brush will engage with contacts on the commutating and brake cylinders A A', either separately or simultaneously. The connections from the brushes to the motors M' M' and the other controller or controllers are inclosed in an insulating-cable B''.

To confine the arc caused by the separating of the contacts when changing the circuit relations, pieces of insulation C are inserted between the brushes and lie in horizontal planes between the cylinders. The pieces C are secured to the plate C', which extends vertically in the front part of the controller. The plate C' is supported by means of the arm R, which is pivoted at the point P in a lug cast integral with the back of the controller. This enables the inspector to make a thorough examination of the working parts by swinging the deflector away from the cylinders without disturbing any of the connections. By arranging the arc-deflector as above described, one deflector is used for both cylinders, thus doing away with an extra part and at the same time lessening the cost of construction.

The operation of the apparatus is as follows: The shaft D'', when it is desired to have the motors propel the vehicle, is rotated to the left by a suitable handle, causing the segmental gear E to engage with the pinion F, which is mounted on the shaft D, and rotating the cylinder A from left to right, making any desired changes in the circuit relations. If the vehicle were traveling, due to momentum or otherwise, and it was desired to apply the brake, the shaft D″ would be rotated in such a direction that the segmental gear E would engage with the pinion F′ and revolve the cylinder A′, which would establish certain relations of the motors, causing them to act as generators and supply current for braking the car. The pinions F and F′ are provided with projections $f$ and $f'$. These projections act as positive stops for the cylinders by abutting the segmental gear E. The last tooth on either side of the gear E is made shorter than the rest, so that it will not rotate the cylinder A′ when the cylinder A is being rotated, and vice versa. These gears are also so arranged that one cylinder must be at the off position before the other cylinder starts its movement.

While the shafts D, D′, and D″ are shown in the same plane, it is not necessary that they be so situated. It is only necessary to arrange the parts in such a manner that both cylinders will not operate to establish different circuits at the same time. The reversing-switch, being sleeved on the actuating-shaft D″, is movable thereon independent of any movement of the shaft. Under normal conditions, the reversing-switch would only be actuated at the time the cylinders were in the off position.

Fig. 3 shows a modification in which the cylinders A and A′ are mounted as before; but motion is imparted thereto by means of the arm G′, actuated by the shaft D″, instead of directly by the shaft, as before. Engaging with the pinions on the shafts F and F′ are two racks H and H′. These are provided with notches at their ends to engage with a pin on the arm G′ whenever it is rotated from a central position. To limit the movement of the racks H and H′, pins $b$ are arranged to work in slots cut therein. To return the cylinders to the off position, spiral springs S and S′ are employed, which are so arranged that the tension increases as the cylinders are turned from the off position to the on position.

Fig. 4 shows a development of the contacts on cylinder A, which, together with the brushes B′, are arranged to connect the motors in series or parallel in a way well understood, and further description is unnecessary.

Fig. 5 shows a development of the brake-cylinder A′, the brushes, &c., having the same letters of reference as in Fig. 4. Assuming the current to emanate at commutator-brush 6, the circuit will be as follows: from commutator-brush 6 to brush 7, to plate 8, cross-connected to plate 9, to brush 10, commutator-brush 11, to armature 12, to commutator-brush 13, to brush 14, connected to brush 29, resistance R R, to brush 15, to plate 16, cross-connected to plate 18, to brush 19, to brake B, thence by dotted line 20 to ground G, field $f$, brush 21, plate 22, cross-connected to plate 23, to brush 24, part of field $f'$, brush 34, plate 33, connected to plate 35, resistance R′, plate 36, brush 26, commutator-brush 27, armature 28, to commutator-brush 6, the point of starting. As the cylinder is rotated, various sections of resistance R are removed until finally the contact-plate 29′ is reached, and the resistance R″ is in parallel with a part of the main resistance R R. A further movement of the cylinder A′ cuts out the resistance R and R″, and when the cylinder is rotated so that brush 32 engages with plate 31, the resistance R′ will be removed, and the generators will be operating on a local circuit with the brake-magnet B. Contacts 33 and brush 34 are arranged to shunt or weaken the generating power of one of the generators. This weakening of the generator is only done at the beginning of the operation, and is for the purpose of allowing one of the two motors which are coupled in opposition to each other in circuit to gain ascendancy over the other, so that they will not neutralize each other and prevent further generation.

It will be seen that the connections of the contact-plates in Fig. 5 are such that the armature and field of the motors are reversed relatively to that shown in Fig. 4. This is done in order that the motors may be converted into generators to supply current to the brake-magnets.

Figs. 6 and 7 show the reversing-switch in detail. The brushes $g$ and $g'$ are arranged on either side of the cylinder, and are adapted to establish connections with the rows of contacts $h$ $h'$ $h^2$ $h^3$, carried by the cylinder. The contacts are connected, as shown in Fig. 7, those in $h$ being cross-connected relative to those in $h'$, and those in $h^2$ relative to those in $h^3$.

Having thus described my invention, what I claim is—

1. In an electric controller, a set of contacts or electrodes, an electric machine connected therewith, power and brake circuits serving such machine, a main moving element of the controller for each circuit, in combination with means for dissimultaneous operation of the said moving elements.

2. In an electric controller, a set of contacts or electrodes, an electric machine connected therewith, a plurality of exterior circuits serving such machine, a main moving element of the controller for each circuit in combination with a common actuator for such elements.

3. In an electric controller, a set of contacts or electrodes, an electric machine connected therewith, a plurality of exterior circuits serving such machine, a main moving element of the controller for each circuit, means for operating one of such elements at a time, in combination with means for holding the other or others in open-circuit relation with said contacts or electrodes.

4. In an electric controller, two or more sets of contacts or electrodes, an electric machine or machines connected therewith, a plurality of main moving elements of the controller coöperating with said sets of contacts, and a common means for actuating said moving elements.

5. In an electric controller, a set of contacts or electrodes, an electric machine or machines connected therewith, a plurality of main moving elements for the controller coöperating with the said contacts, in combination with a reversing-switch for the machine or machines common to the two elements.

6. In an electric controller, a set of contacts or electrodes, an electric machine or machines connected therewith, a plurality of main moving elements for the controller coöperating with the said contacts, in combination with contact-separating insulations common to the two elements.

7. In an electric controller, a set of contacts or electrodes, an electric machine or machines connected therewith, a plurality of main moving elements for the controller coöperating with the said contacts, in combination with contact-separating insulations common to the two elements, the said insulations secured together in a group, and a hinged support for said group.

8. In an electric controller, the combination of a plurality of contact-cylinders with a common arc-deflector for the cylinders.

9. In an electric controller, the combination of a plurality of contact-cylinders, an arc-deflector common to the cylinders, and means for supporting the deflector in such a manner that it may be swung away from the cylinders.

10. In an electric controller, the combination of a cylinder for regulating the energy supplied to the motors, a cylinder for regulating the energy supplied to the brake-magnets, an arc-deflector with partitions separating the contacts and brushes, and an arm to which the deflector is attached, permitting the deflector to be swung outwardly.

11. In an electric controller, the combination of commutating and brake cylinders, and means common to both for imparting motion thereto, the said means being arranged in such a manner that when motion is imparted to one cylinder, the other is stationary and at the off position.

12. In an electric controller, the combination of a main actuating-shaft, a reversing-switch sleeved on said shaft, a plurality of contact-cylinders, and gearing between the actuating-shaft and the cylinders permitting a dissimultaneous operation of the cylinders.

13. In an electric controller, the combination of a main actuating-shaft, a reversing-switch sleeved on the shaft, a sector for operating the reversing-switch, contact-cylinders, gears on the shafts of the cylinders, a segmental gear carried by the actuating-shaft, and means for preventing a simultaneous operation of the contact-cylinders.

14. In a controller, the combination of a reversing-switch cylinder sleeved on the main actuating-shaft, brushes on either side of the cylinder, a gear rigidly attached to the cylinder, a sector engaging therewith, and a handle for operating the same.

15. In an electric controller, the combination of a plurality of contact-cylinders, with a single set of brushes adapted to engage therewith.

16. In an electric controller, the combination of a plurality of contact-cylinders, a single set of brushes engaging therewith, and connections from the brushes to the motors.

17. In an electric controller, the combination of commutating and brake cylinders, and a set of bifurcated brushes mounted between the cylinders, and making contact with both cylinders.

ELMER A. SPERRY.

Witnesses:
S. BRASHEARS, Jr.,
E. M. YOST.